United States Patent
Lewis et al.

(10) Patent No.: US 6,289,467 B1
(45) Date of Patent: Sep. 11, 2001

(54) INSTALLATION OF PROCESSOR AND POWER SUPPLY MODULES IN A MULTIPROCESSOR SYSTEM

(75) Inventors: Quentin J. Lewis, Litchfield, NH (US); James F. Mara, Littleton; Alex N. Pappas, Westford, both of MA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/075,026

(22) Filed: May 8, 1998

(51) Int. Cl.$^7$ .............................. G06F 1/26; G06F 1/28; G06F 1/30
(52) U.S. Cl. .................. 713/340; 710/101; 710/102; 710/103; 713/310; 713/320; 714/11; 714/14; 714/46
(58) Field of Search ..................... 710/101, 102, 710/103; 713/300–340; 327/142; 700/295; 714/11, 14, 46; 370/219; 340/541, 661, 660

(56) References Cited

U.S. PATENT DOCUMENTS

| | | | |
|---|---|---|---|
| 4,559,497 | * 12/1985 | Farrugia | 324/133 |
| 4,609,914 | * 9/1986 | Fathi | 340/660 |
| 4,639,864 | * 1/1987 | Katzman et al. | 714/14 |
| 4,879,625 | * 11/1989 | Potenzone | 361/90 |
| 5,047,751 | * 9/1991 | Miura et al. | 340/661 |
| 5,414,409 | * 5/1995 | Voosen et al. | 340/541 |
| 5,519,832 | * 5/1996 | Warchol | 714/46 |
| 5,983,297 | * 11/1999 | Noble et al. | 710/102 |
| 6,051,964 | * 4/2000 | Brown et al. | 323/288 |

\* cited by examiner

Primary Examiner—Rupal Dharia
(74) Attorney, Agent, or Firm—Blakely Sokoloff Taylor & Zafman

(57) ABSTRACT

The present invention discloses a method and apparatus for checking an installation of a plurality of power supply modules in a multiprocessor system having a plurality of processor modules. A detector detects if one of the processor modules is present. A voltage monitor monitors the voltage level of one of the power supply modules which corresponds to the processor module. A control circuit generates a control signal to turn off the power if the processor module is present and the voltage level is outside an operating range.

18 Claims, 4 Drawing Sheets

INSTALLATION OF PROCESSOR AND POWER SUPPLY MODULES IN A MULTIPROCESSOR SYSTEM

BACKGROUND OF THE INVENTION

1. Field of the Invention

This invention relates to computer systems. In particular, the invention relates to installation of power and processor modules in a multiple processor system.

2. Description of Related Art

A multiple processor computer system has a number of processors operating in parallel. Usually, a system designed for multiple processor operation does not have all the processors present when the system is first put in operation. This will allow a user to add additional processors to the system according to his needs and budget.

A multiple processor system has a number of card slots reserved for specified functional modules such as processor modules, memory modules, and power supply modules. Different configurations may have different power supply requirements. Therefore, to maintain expandability with low-cost, it is preferable to be able to configure the power supply modules according to the processor modules. In this configuration, each processor module has its own corresponding power supply module to be plugged in separate card slots. Without its own power supply, a processor module may contend with other modules or the mother board, causing damages.

In addition, during installation, when the user plugs the power supply module into the card slot, he or she may not be aware whether the installation is correct; i.e., whether the power supply module is plugged into the slot corresponding to the correct processor module.

Therefore, there is a need in the technology to provide a technique to check the installation of the power supply modules in a multiple processor system to avoid damages to the processor modules.

SUMMARY OF THE INVENTION

The present invention discloses a method and apparatus for checking an installation of a plurality of power supply modules in a multiprocessor system having a plurality of processor modules. A detector detects if one of the processor modules is present. A voltage monitor monitors the voltage level of one of the power supply modules which corresponds to the processor module. A control circuit generates a control signal to turn off the power if the processor module is present and the voltage level is outside an operating range.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for checking the installation of power supply modules in a multiple processor system. During installation, the system detects the presence of a processor module and its corresponding power supply module. An indicator is provided if there is a mismatch. During power on, the system monitors the power supply levels for each power supply module, and detects the presence of each processor module. If there is any processor-supply mismatch, the system turns off the system power supply to prevent damages.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
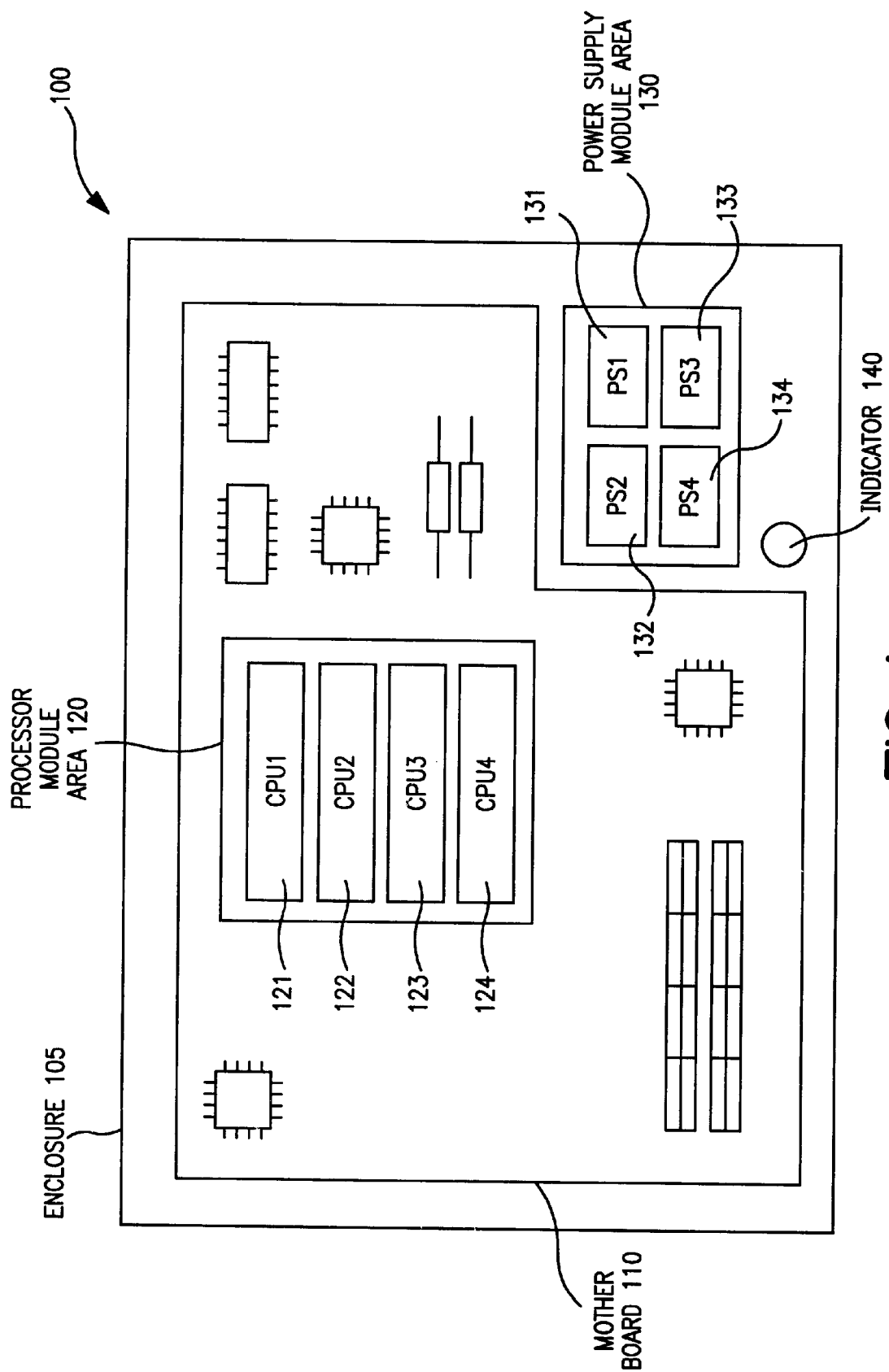
FIG. 1 is a diagram illustrating one embodiment of a system in accordance with the teachings of the invention.

FIG. 1 is a diagram illustrating one embodiment of a system in accordance with the teachings of the invention. The system 100 includes an enclosure 105, a motherboard 110, a processor module area 120, a power supply area 130, and an indicator 140.

The enclosure 105 provides housing for the various boards and modules. The enclosure 105 has partitions to group modules according to their functionality. The enclosure 105 has opening for user access during installation.

The motherboard 110 contains circuitry for performing various coordination, control, and management functions.

The processor module area 120 includes a number of card slots for plugging in the processor modules. In one embodiment, the number of card slots is four. The processor module area 120 includes card slots 121, 122, 123, and 124 to accept processor modules CPU1, CPU2, CPU3, and CPU4, respectively. Each processor module is a slot-pluggable card containing one or more processors and associated elements.

The power supply area 130 includes a number of card slots for plugging in the power supply modules. In one embodiment, the number of card slots in the power supply area 130 is the same as the number of card slots in the processor module area 120. The power supply area 130 includes card slots 131, 132, 133, and 134 to accept power supply modules PS1, PS2, PS3, and PS4, respectively. In one embodiment, each power supply module is a DC-DC converter to convert the DC voltage level from the main power supply source to the proper DC voltage level as required by the corresponding processor module. Each power supply module provides the DC power to a designated processor module. The power supply modules PS1, PS2, PS3, and PS4, provide power to the processor modules CPU1, CPU2, CPU3, and CPU4, respectively.

The indicator 140 provides status information to the user during installation. In one embodiment, the indicator 140 is a visual indicator made by a light emitting diode (LED). As is known by one skilled in the art, other types of indicator (e.g., audible) can be used. The indicator 140 provides a means to inform the user whether he or she has installed the power supply module correctly.

Figure 2:
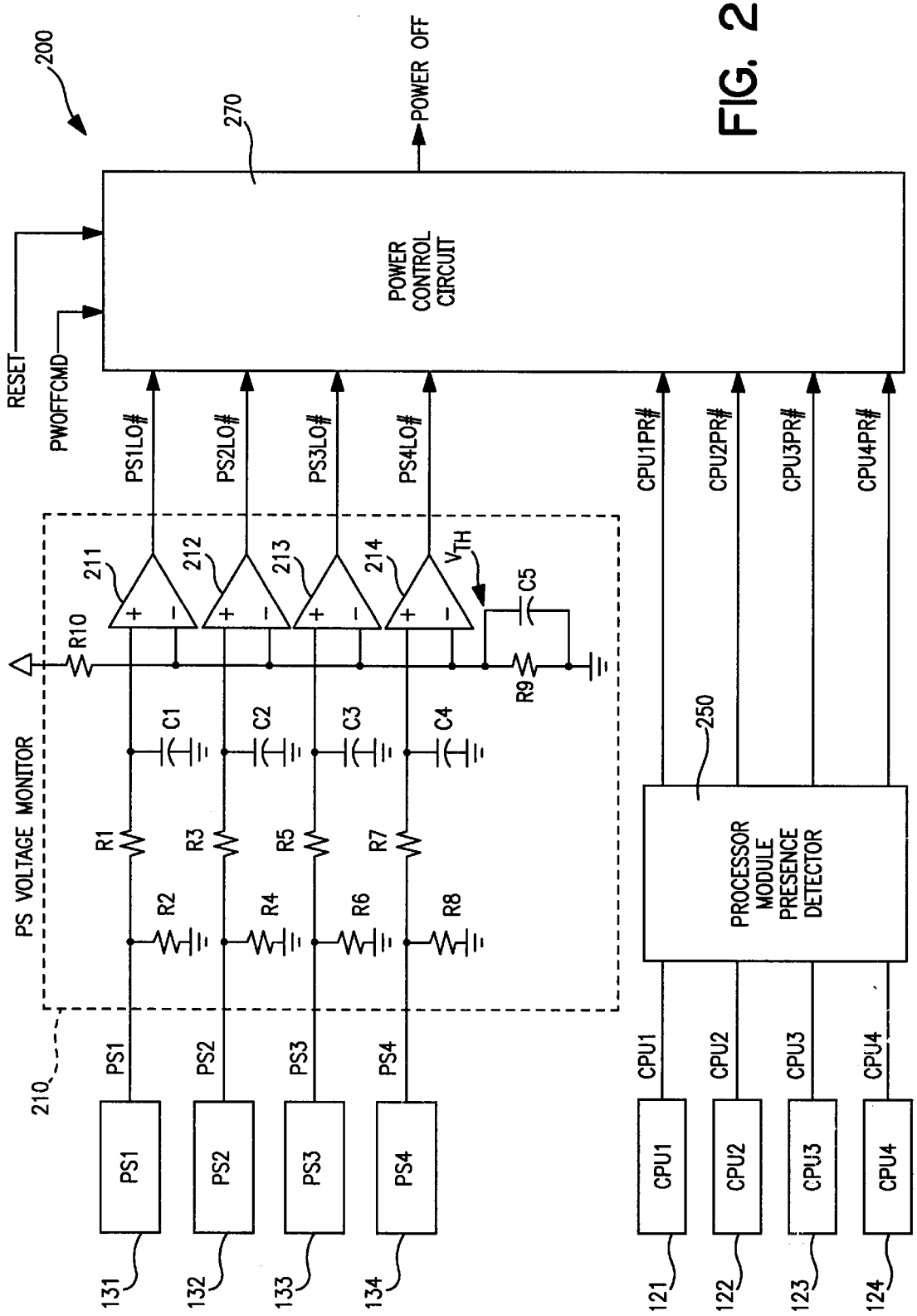
FIG. 2 is a diagram illustrating a match detection circuit according to one embodiment of the invention.

FIG. 2 is a diagram illustrating a match detection circuit according to one embodiment of the invention. The match detection circuit 200 includes a power supply voltage monitor 210, a processor module presence detector 250, and a power control circuit 270.

The power supply (PS) voltage monitor 210 receives the four PS signals PS1, PS2, PS3, and PS4, representing the voltage levels of the power supply modules 131 (PS1), 132 (PS2), 133 (PS3), and 134 (PS4), and generates four signals PS1LO#, PS2LO#, PS3LO#, and PS4LO# corresponding to the power supply modules PS1, PS2, PS3, and PS4, respectively. The PS voltage monitor 210 monitors the voltage level of the PS module to determine if the voltage level is within an acceptable range or if the PS module is present, or plugged in.

The PS voltage monitor 210 includes four comparators 211, 212, 213, and 214; resistors R1, R2, R3, R4, R5, R6, R7, R8, R9, and R10; and capacitors C1, C2, C3, C4, and C5. Resistors R1, R2, and capacitor C1 provide filtering and signal conditioning to the PS1 signal. Resistors R3, R4, and capacitor C2 provide filtering and signal conditioning to the PS2 signal. Resistors R5, R6, and capacitor C3 provide filtering and signal conditioning to the PS3 signal. Resistors R7, R8, and capacitor C4 provide filtering and signal conditioning to the PS4 signal. The filtered and conditioned signals become inputs to the corresponding comparators.

Each comparator is used to monitor the voltage level of each power supply module. Each comparator is essentially an operational amplifier operating in a differential mode. The positive terminal of the comparator is connected to the filtered PS signals. The negative terminal of the comparator is connected to a predetermined threshold voltage level, VTH. In one embodiment, this predetermined voltage level VTH is provided by a voltage divider connected to a system power supply voltage. In another embodiment, this predetermined voltage level is a reference voltage provided by some constant voltage source.

The four comparators 211, 212, 213, and 214 generate the four output signals PS1LO#, PS2LO#, PS3LO#, and PS4LO#, respectively. Each of these signals is asserted LOW when the corresponding PS signal is at a voltage level lower than the VTH, or when there is no PS signal (e.g., when the power supply module is not plugged in). Each of these signals is deasserted, or negated, HIGH when the corresponding PS signals is within an acceptable range.

The processor module presence detector 250 receives the CPU1, CPU2, CPU3, and CPU4 signals from the processor modules 121 (CPU1), 122 (CPU2), 123 (CPU3), and 124 (CPU4). In one embodiment, the CPU1, CPU2, CPU3, and CPU4 signals together indicate the speed of the processor clock. For each processor module, there are eight possible speeds which can be encoded by three pins, known as frequency select pins. The assertion of any of these frequency select pins indicates the presence of the corresponding processor module. If a processor module is present and active, the three frequency select signals representing the processor clock speeds are set to a non-zero state. A processor is detected when these three frequency select pins are detected as being in a non-zero state (i.e., one of the seven out of the eight possible states).

The processor module presence detector 250 generates four CPU1PR#, CPU2PR#, CPU3PR#, and CPU4PR# signals. Each of the four signals indicates the corresponding processor module is present and active. The CPU1PR#, CPU2PR#, CPU3PR#, and CPU4PR# signals are asserted LOW if the processor modules 121, 122, 123, and 124 are present and active, respectively.

The power control circuit 270 receives the PS1LO#, PS2LO#, PS3LO#, and PS4LO# signals from the PS voltage monitor 210; the CPU1PR#, CPU2PR#, CPU3PR#, and CPU4PR# signals from the processor module presence detector 250; and the RESET and PWOFFCMD signals from the mother board 110 or other external circuits. The power control circuit 270 generates the POWEROFF signal. The power control circuit 270 essentially performs the matching function to match the PS1LO#, PS2LO#, PS3LO#, and PS4LO# signals with the CPU1PR#, CPU2PR#, CPU3PR#, and CPU4PR# signals to determine if the corresponding signals are properly asserted.

The RESET signal is generated by a power on reset circuitry that detects a reset control from the main power switch. When the RESET signal is asserted HIGH, the system is reset. A boot up sequence will start after the reset period. The PWOFFCMD signal is a power off command signal as generated by another control module or another subsystem. The PWOFFCMD signal allows another subsystem to control the power up of the processor modules. The PWOFFCMD signal is asserted HIGH if the control subsystem wants to turn off the power of the subsystem containing the processor modules 121, 122, 123, and 124.

The POWEROFF signal is used to turn off the power when it is asserted HIGH by the power control circuit 270. In one embodiment, the power to be turned off is the main power supply to the system. In another embodiment, the power to be turned off is the power to the subsystem including the processor modules.

The power control circuit 270 includes logic gates to match the PS1LO#, PS2LO#, PS3LO#, and PS4LO# signals with the CPU1PR#, CPU2PR#, CPU3PR#, and CPU4PR# signals. In one embodiment, the power control circuit 270 is implemented in a programmable logic device (PLD). In another embodiment, the power control circuit 270 is implemented by discrete logic elements.

The power control circuit 270 matches the PS1LO#, PS2LO#, PS3LO#, and PS4LO# signals with the CPU1PR#, CPU2PR#, CPU3PR#, and CPU4PR# signals pairwise. If there is any mismatch, the power control circuit 270 asserts the POWEROFF signal to turn off the power. For four pairs of processor modules and power supply modules, the four matching conditions are:

For processor module and power supply module pair number 1: (PS1LO#=LOW and CPU1PR#=LOW) or (PS1LO#=HIGH and CPU1PR#=HIGH).

For processor module and power supply module pair number 2: (PS2LO#=LOW and CPU2PR#=LOW) or (PS2LO#=HIGH and CPU2PR#=HIGH).

For processor module and power supply module pair number 3: (PS3LO#=LOW and CPU3PR#=LOW) or (PS3LO#=HIGH and CPU3PR#=HIGH).

For processor module and power supply module pair number 4: (PS4LO#=LOW and CPU4PR#=LOW) or (PS4LO#=HIGH and CPU4PR#=HIGH).

The above four matching conditions correspond to one embodiment in which it is required that if a module (processor or power supply) is present, its corresponding module (power supply or processor) should also be present.

In another embodiment, it is acceptable for a power supply module to be present without the corresponding processor module, but it is not acceptable for the processor module to be present without the corresponding power supply module. In that case, the logic equations can be modified accordingly.

The above conditions are gated with the RESET and PWOFFCMD signals. In other words, the power control circuit 270 asserts the POWEROFF signal HIGH if PWOFFCMD is asserted or if any of the above 4 conditions is violated. The RESET signal is used at power-on to allow all power supply modules and logic gates to come alive and stabilize. The logic equation for the POWEROFF signal is:

POWROFF=!RESET & ((PS1LO# XOR CPU1PR#)| (PS2LO# XOR CPU2PR#)|(PS3LO# XOR CPU3PR#) |(PS4LO# XOR CPU4PR#)|PWOFFCMD)

where !, &, and I denote the NOT, AND, and OR operations, respectively.

Figure 3:
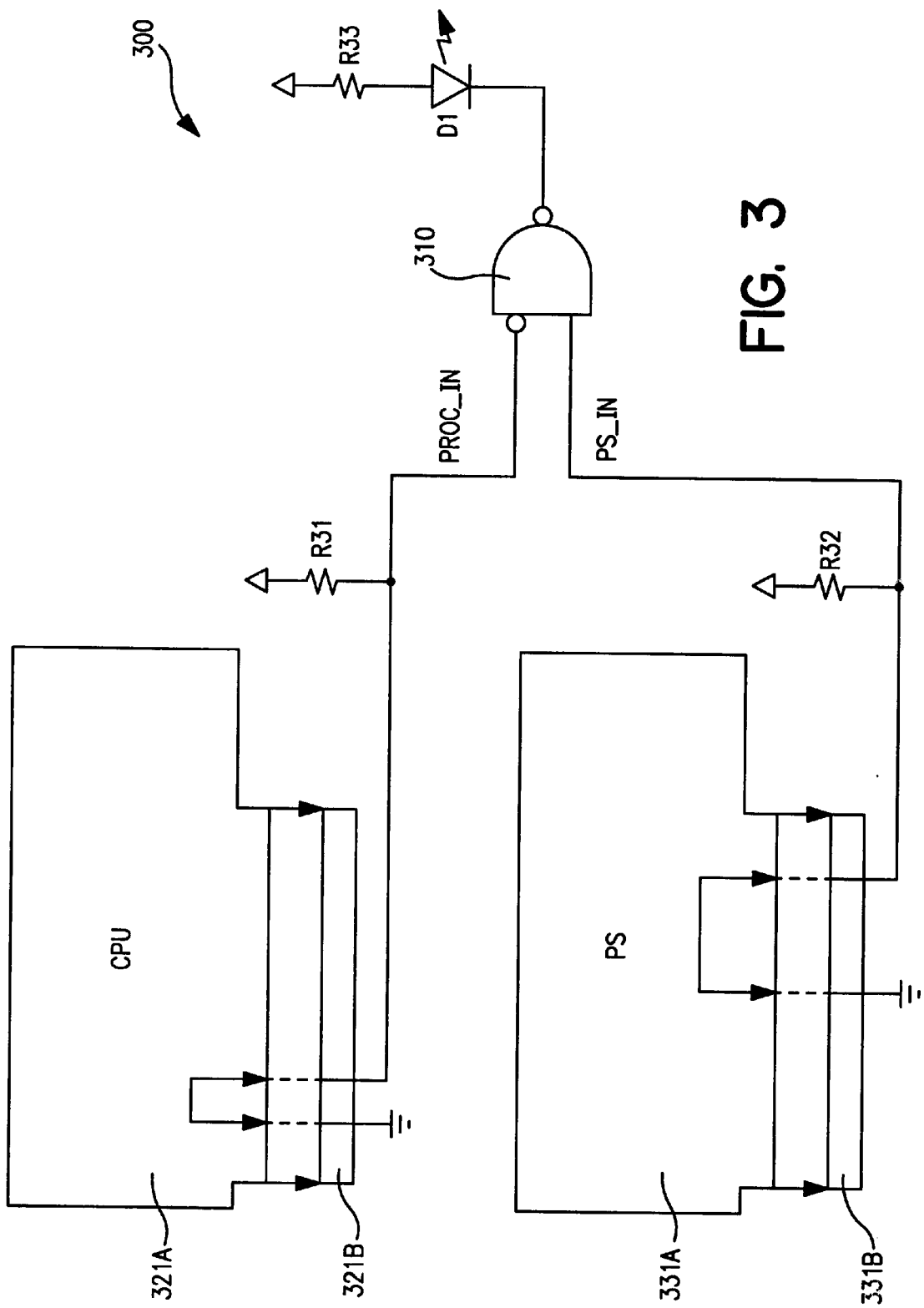
FIG. 3 is a diagram illustrating an installation guiding control circuit according to one embodiment of the invention.

FIG. 3 is a diagram illustrating an installation guiding control circuit 300 according to one embodiment of the invention. The installation guiding control circuit 300 includes resistors R31, R32, and R33, a logic gate 310, a light emitting diode (LED) D1. The installation guiding control circuit 300 interfaces to the processor module 321A at the processor slot connector 321B and to the power supply module 331A at the power supply slot connector 331B. During installation, the power supply modules are turned off but there is a standby power source for remote diagnosis or for local installation service. The installation guiding control circuit 300 is powered by the standby power source.

The resistors R31 and R32 act as pull-up resistors at the inputs of the logic gate 310. The inputs to the logic gate 310 are connected to ground when the corresponding module is plugged into the slot connector. In other words, the module has a signal trace to connect the signal to the input of the logic gate 310 to the ground. Essentially the module acts like a jumper circuit to force the input to the logic gate 310 to ground. If the module is not plugged in, the connection between the input signal to the logic gate 310 and ground is not made, leaving the input signal to be pulled up to the logic HIGH level by the corresponding pull-up resistor R31 or R32.

The logic gate 310 is an NAND gate having an inverter at one of the two input signals. One input signal, PROC_IN, is connected to the processor connector 321B and the other input signal, PS_IN, is connected to the power supply connector 331B. The input PROC_IN signal is inverted before going to the NAND gate. The output of the NAND gate is connected to the cathode of the LED D1. The resistor R33 is a current limiting resistor to limit the amount of current to flow through the LED D1. When the output of the NAND gate is LOW, the LED D1 is forward biased, allowing current to run through and emits appropriate color. When the output of the NAND gate is HIGH, the LED D1 is reverse biased, blocking the current from running through, and no light is emitted. An ON LED indicates an abnormal or error condition. An OFF LED indicates a normal condition.

The action of the installation guiding control circuit 300 is based on the following function table:

| PROC_IN | PS_IN | processor plugged-in | power supply plugged-in | LED |
|---------|-------|----------------------|-------------------------|-----|
| 0 | 0 | YES | YES | OFF |
| 0 | 1 | YES | NO | ON |
| 1 | 0 | NO | YES | OFF |
| 1 | 1 | NO | NO | OFF |

Therefore, the LED is ON only when the processor module is plugged in AND the corresponding power supply module is not plugged-in. In the embodiment that use the above function table, it is acceptable for the power supply to be plugged in while its corresponding processor module is not plugged in. As is known by one skilled in the art, the above function table can be modified easily to accommodate other conditions.

The logic gate 310 can be realized by discrete logic elements or by programmable logic devices.

Figure 4:
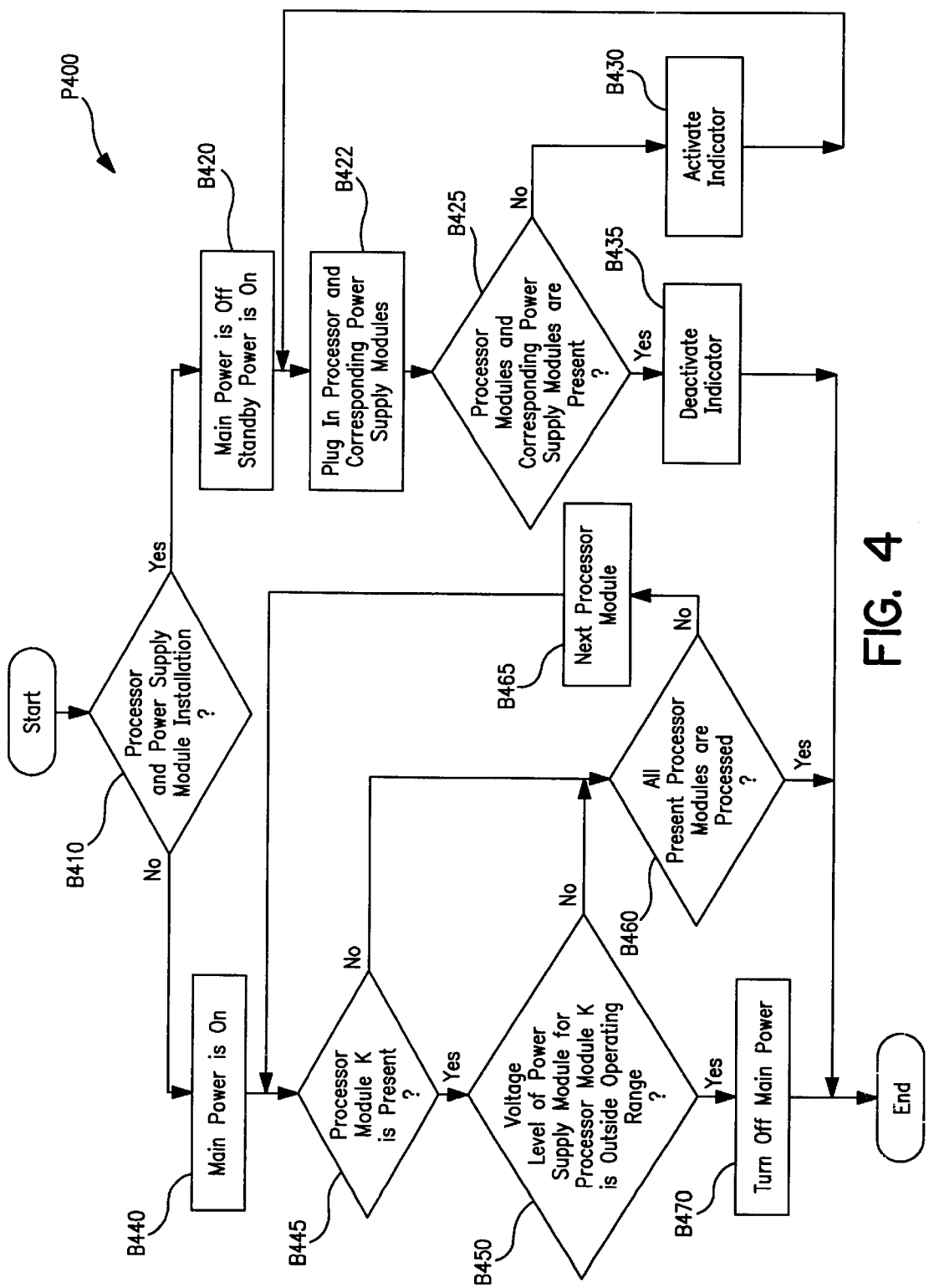
FIG. 4 is a flow diagram illustrating a process to detect power misplug according to one embodiment of the invention.

FIG. 4 is a flow diagram illustrating a process P400 to detect power misplug according to one embodiment of the invention.

At start, the process P400 enters block B410 to determine if the user is in the installation mode to plug in the power supply module. If YES, the process P400 branches to block B420. If NO, the process P400 enters block B440.

In block B420, the main power is turned off because the user is in the installation mode. The standby power, however, remains on. The standby power provides sufficient current and voltage to the installation guiding control circuit as shown in FIG. 3. The user then installs the power supply and processor modules by plugging these modules in the their respective card slots (B422). Then the process P400 enters block B425 to determine if there is a match between the processor modules and the power supply modules. If there is no match, the warning indicator is activated (e.g., LED is turned ON) in block B430 and the process goes back to block B422. If all modules match, the process P400 de-activates the warning indicator in block B435 and then terminates.

In block B440, the main power is on after all the power supply modules are installed. The process P400 then enters block B445 to determine if the processor module k is present where k is an index for the processor module number (k is initialized to a value corresponding to the first processor module). If the processor module k is present, the process P400 enters block B450. If the processor module k is not present, the process P400 enters block B460.

In block B450, the process P400 determines if the voltage level of the power supply module for the processor module k is outside the operating range. This situation includes the cases where the power supply module malfunctions and when the power supply module is not plugged in. If the voltage level of the power supply module is outside the operating range, the process P400 enters block B470 to turn off the main power. Then the process P400 terminates. If the voltage level of the power supply module is not outside the operating range, i.e., within the normal range, then the process P400 enters block B460.

In block B460, the process P400 determines if all the present processor modules have been examined or processed. If not, the process P400 enters block B465 to prepare for the next processor module and then goes back to block B445. If all processor modules have been examined, the process P400 terminates. Although the blocks to examine the processor modules are shown to be sequential, the process can be performed in parallel.

Therefore, the present invention discloses a method and apparatus to determine if the installation of the power supply and processor modules in a multiprocessor system is proper. The technique provides warning to the user and prevents damage to the processor modules.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    detecting if one of a plurality of processor modules is present based on signals from the processor modules;
    monitoring a voltage level of one of a plurality of power supply modules, said one of the power supply modules corresponding to said one of the processor modules; and
    generating a control signal to turn off power if said one of the processor modules is present and said voltage level is outside an operating range.

2. The method of claim 1 wherein detecting if one of the processor modules is present includes determining if a frequency select state of the processor is non-zero.

3. The method of claim 1 wherein the monitoring of the voltage level includes comparing said voltage level to a predetermined threshold voltage.

4. The method of claim 1 wherein before monitoring the voltage level, the method further comprises:
- detecting if said one of the power supply modules is present; and
- activating an indicator if said one of the processor modules is present and said one of the power supply modules is not present.

5. The method of claim 4 wherein the indicator is one of a visual indicator and an audible indicator.

6. The method of claim 1 wherein said voltage level is outside said operating range when said one of the power supply modules is not present.

7. An apparatus comprising:
- a detector to detect if one of a plurality of processor modules is present based on signals from the processor modules;
- a voltage monitor to monitor a voltage level of one of a plurality of power supply modules, said one of the power supply modules corresponding to said one of the processor modules; and
- a control circuit coupled to the detector and the voltage monitor, the control circuit to generate a control signal to turn off power if said one of the processor modules is present and said voltage level is outside an operating range.

8. The apparatus of claim 7 wherein the voltage monitor further comprises a comparator to compare said voltage level with a predetermined threshold voltage.

9. The apparatus of claim 7 wherein the control circuit is implemented in a programmable logic device.

10. The apparatus of claim 7 further comprises
- a power module detector to detect if said one of the power supply modules is present; and
- an activating circuit to activate an indicator if said one of the processor modules is present and said one of the power supply modules is not present.

11. The apparatus of claim 10 wherein the indicator is one of a visual indicator and an audible indicator.

12. The apparatus of claim 7 wherein said voltage level is outside said operating range when said one of the power supply modules is not present.

13. A system comprising:
- a plurality of processor modules;
- a plurality of power supply modules for providing power to said plurality of processor modules; and
- a checking circuit for checking an installation of the plurality of power supply modules, the checking circuit including:
  - a detector to detect if one of the processor modules is present based on signals from the processor modules,
  - a voltage monitor to monitor a voltage level of one of the power supply modules, said one of the power supply modules corresponding to said one of the processor modules, and
- a control circuit coupled to the detector and the voltage monitor, the control to generate a control signal to turn off power if said one of the processor modules is present and said voltage level is outside an operating range.

14. The system of claim 13 wherein the voltage monitor further comprises a comparator to compare said voltage level with a predetermined threshold voltage.

15. The system of claim 13 wherein the control circuit is implemented in a programmable logic device.

16. The system of claim 13 further comprises
- a power module detector to detect if said one of the power supply modules is present; and
- an activating circuit to activate an indicator if said one of the processor modules is present and said one of the power supply modules is not present.

17. The system of claim 16 wherein the indicator is one of a visual indicator and an audible indicator.

18. The system of claim 13 wherein said voltage level is outside said operating range when said one of the power supply modules is not present.

\* \* \* \* \*